United States Patent [19]

Hadano

[11] Patent Number: 5,325,354
[45] Date of Patent: Jun. 28, 1994

[54] SYNCHRONOUS TERMINAL STATION RECEIVING SYSTEM

[75] Inventor: Satoru Hadano, Tokyo, Japan

[73] Assignee: NEC Corporation, Japan

[21] Appl. No.: 860,680

[22] Filed: Mar. 30, 1992

[30] Foreign Application Priority Data

Mar. 28, 1991 [JP] Japan .................. 3-106342

[51] Int. Cl.$^5$ .............................................. H04J 3/14
[52] U.S. Cl. .................................. 370/16; 370/13;
370/100.1; 370/105.1; 370/112; 371/8.1;
371/8.2; 371/11.1; 371/11.2; 340/825.01
[58] Field of Search ............ 370/13, 16, 100.1, 105.1,
370/112; 371/8.1, 8.2, 11.1, 11.2; 340/825.01

[56] References Cited

U.S. PATENT DOCUMENTS

| 4,601,028 | 7/1986 | Huffman et al. .............. 370/13 X |
| 4,774,703 | 9/1988 | Force et al. ..................... 370/16 |
| 5,051,979 | 9/1991 | Chaudhuri et al. .............. 370/16 |
| 5,128,939 | 7/1992 | Takatori et al. ............. 370/100.1 |
| 5,172,376 | 12/1992 | Chopping et al. ............ 370/100.1 |

*Primary Examiner*—Douglas W. Olms
*Assistant Examiner*—Russell W. Blum
*Attorney, Agent, or Firm*—Ostrolenk, Faber, Gerb & Soffen

[57] ABSTRACT

Pointer information that shows the bit time slot in a frame of low order group signals in which a leading location of substantial data of the low order group signals is placed, is utilised to provide a synchronous terminal station system of a 1:N redundancy configuration type having first to M-th main receiving units and a standby receiving unit which are housed separately. Each main receiving unit has a switching section which receives particular low order group signals demultiplexed in it and standby low order group signals from the standby receiving unit and transfers selected signals to a pointer conversion circuit. The pointer conversion circuit modifies pointer information to make the selected signal comply with a particular signal format of the main receiving unit.

2 Claims, 6 Drawing Sheets

SYNCHRONOUS TERMINAL STATION RECEIVING SYSTEM

FIELD OF THE INVENTION

This invention relates to a synchronous terminal station system having M main transmission path and a standby transmission path which receives and demultiplexes multiplexed transmission path signals from a plurality of low order group signals. Such a synchronous terminal station system receives a signal which has in each of its frame pointer information that shows the bit time slot in which a leading location of informative data is placed.

BACKGROUND OF THE INVENTION

A conventional synchronous terminal receiving station system consists of a large casing frame that is installed on the floor. In side this casing is housed at least one main receiving unit and one standby receiving unit. The main receiving unit receives and demultiplexes high-speed higher order group signals in which a plurality of frame-synchronized low order group signals are multiplexed, through a transmission path. The synchronous terminal station receiving system also has a monitor circuit to monitor the main transmission unit. When the unit fails the main transmission path is switched to the standby transmission path. Such a communication system is disclosed in U.S. Pat. No. 4,601,028.

However, in cases where a synchronous terminal station system has to receive and demultiplex transmission path signals multiplexed a larger number of low order group signals, it becomes impossible to integrate all of the main receiving units and a standby receiving unit into one casing frame because in this case the scale of the circuits becomes larger. For this reason, it is necessary to provide separate casing frames for each main receiving unit and the standby receiving unit.

An explanation on work of a such conventional main receiving unit is performed as below. In this case, after being demultiplexed, signals inputted from a main transmission path are moved in a pointer conversion circuit section on a clock and a local frame in a casing frame in which the main receiving unit is housed. Also, the main receiving unit modifies the pointer value of the signals corresponding to its pointer value and transmits them to a low order group transmission path. However, when the main transmission path or the main receiving unit fails, the transmission path is switched to a standby transmission path. After being demultiplexed in the standby receiving unit, the signals inputted from the standby transmission path are moved in the pointer conversion circuit section of the standby receiving unit on a clock and a frame within the unit in which the standby receiving unit is housed. Also, the standby receiving unit modifies the pointer value of the signals corresponding to its pointer value and transmits them to the frame in which the main receiving unit is housed. The low order group signals inputted from the standby unit is transmitted to a low order group transmission path. However, as the main receiving unit and the standby receiving unit are housed in frames separately, the clocks in each frame are independent of each other. Therefore, when the low order group signals inputted from the standby receiving unit is switched to be transmitted to the low order group transmission path in an abnormal condition, the clock phase and the frame phase of the low order group signals transmitted to the low order group transmission path are modified. For this reason, in the main receiving unit the clock phase and the frame phase have to be matched to the clock and the frame within the unit in the frame casing in which the main receiving unit is housed in the both cases of transmitting the low order group signals demultiplexed in the main receiving unit to the low order group transmission path and transmitting the low order group signals demultiplexed in the standby receiving unit to the low order group transmission path. To accomplish this, the low order group signals have to be stored in a buffer memory for the time required to adjust the phases. In this case, each buffer memory for each low order group signal must have a memory capacity for one frame of the low order group signals. For example, when STM-1 (STM:Synchronous Transport Module) signals of CCITT Recommendation G.708 are given as the low order group signals, high-speed memories of a large capacity equivalent to 19440 bits for a frame of a STM-1 signal (155,52 Mb/s) are required. This results in the scale of the circuitry becoming extremely large.

SUMMARY OF THE INVENTION

This invention is to solve the above mentioned problems by using a pointer information that shows the bit time slot in a frame of low order group signals in which a leading location of substantial data of low order group signals is placed.

The synchronous terminal station system in this invention is such a synchronous terminal station system of a 1:N redundancy configuration type having first to M-th ($M \geq 1$) main receiving units which receive first to M-th main transmission path signals, adjust said signals to predetermined frame phases after demultiplexing, generate first to N-th ($N \geq 2$) low order group signals and send said low order group signals to first to N-th low order group transmission paths, said system further containing a standby receiving unit which has a standby transmission path for said first to M-th main transmission paths, receives standby transmission path signals, adjusting said signals to a predetermined local frame phase after demultiplexing, generates first to N-th low order group signals and sends said signals to said main receiving units, characterized by an $m(1 \leq m \leq M)$-th main receiving unit having:

frame synchronization means for receiving and frame-synchronizing a framed main transmission path signal having N low order group signals multiplexed, and pointer information inserted in each frame, said pointer information being indicative of a data start location for each of said low order group signal;

overhead termination means for terminating overheads of a frame-synchronized output of said frame synchronization means;

means for demultiplexing an output signal of said overhead termination means, and outputting N low order group signals;

first pointer conversion circuit means for converting N low order group signals outputted from said demultiplexing means, using an m-th local clock and frames generated by said m-th local clock, and modifying pointer values of said N low order group signals, said m-th local clock being frequency-synchronized with a reference clock within said m-th main receiving unit;

branch means for receiving said N low order group signals outputted from said standby receiving unit, branching each of said low order group signal to two;

selection means for receiving one output of said selection means and said N low order group signals outputted from said first pointer conversion circuit means, outputting signals inputted from said first pointer conversion circuit means at normal condition, and outputting signals inputted from said branch means when said main receiving unit is in failure;

selection control means for controlling a selection condition of said selection means based on fault information detected in said frame synchronization mean and said overhead termination means;

second pointer conversion circuit means for converting N low order group signals outputted from said selection means, using said m-th local clock and frames generated by said m-th local clock, and modifying pointer values of said N low order group signals; and overhead insertion section means for inserting overheads to said N low order group signals outputted from said second pointer conversion circuit means, and supplying framed N low order group signals onto said N low order group transmission paths;

and further characterized by said standby receiving unit having:

frame synchronization section means for receiving and frame-synchronizing a framed standby transmission path signal having N low order group signals multiplexed, and pointer inserted in each frame, said pointer information being information indicative of a data start location for each of said low order group signal;

overhead termination means for terminating overheads of an frame-synchronized output of said frame synchronization means;

means for demultiplexing an output signal of said overhead termination means, and outputting N low order group signals; and pointer conversion circuit means for converting N low order group signals outputted from said demultiplexing means, using a standby local clock and frames generated by said local clock, modifying pointer values of said N low order group signals, and outputting said N low order group signals thus converted and modified onto said receiving units, said standby local clock being frequency-synchronized with a reference clock within said standby receiving unit.

DESCRIPTION OF THE EMBODIMENT OF THE INVENTION

Figure 1:
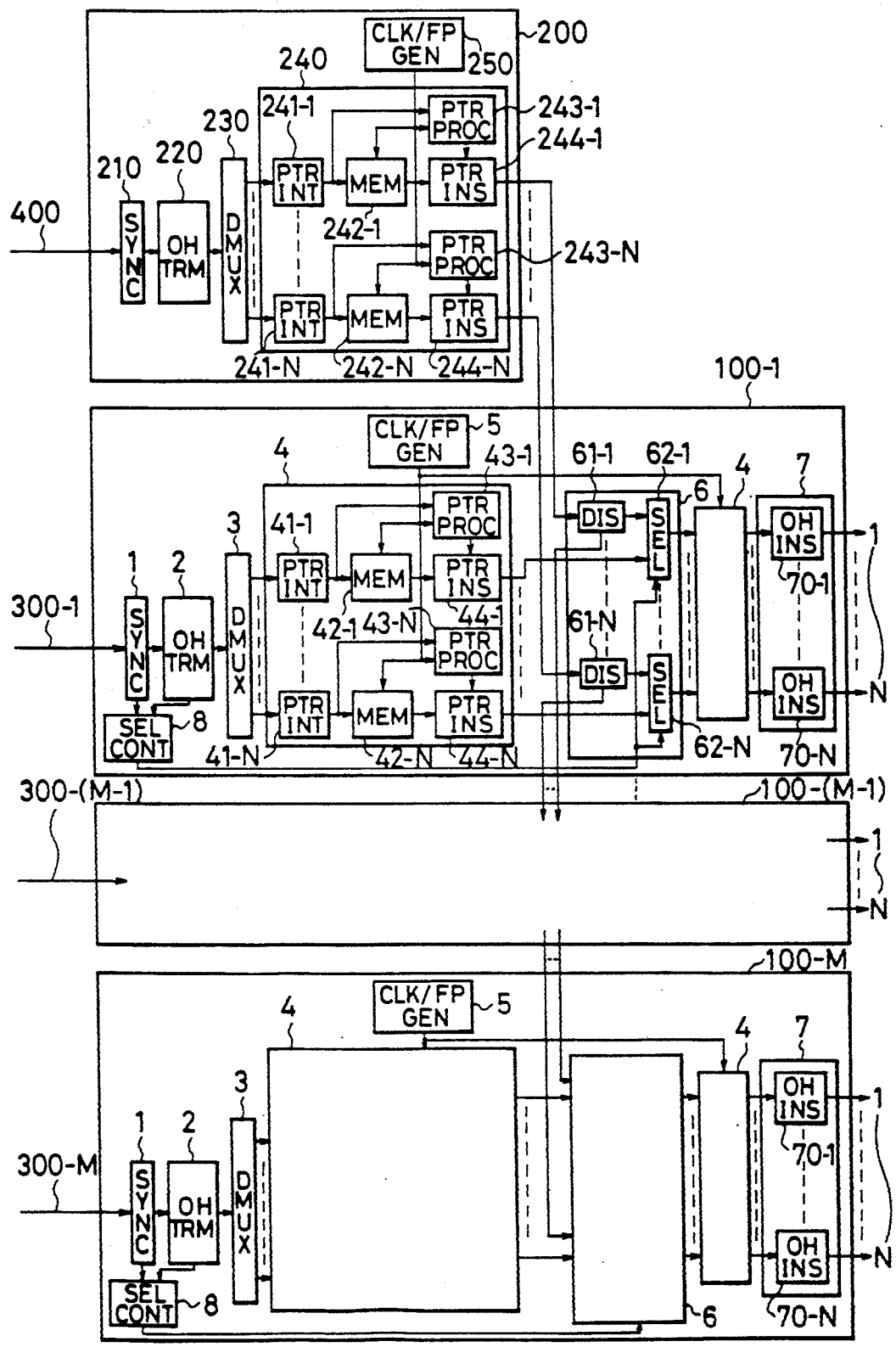
FIG. 1 illustrates a block diagram of an embodiment of this invention

Next, referring to the figures, the invention is described. FIG. 1 illustrates a block diagram of an embodiment of this invention.

The synchronous terminal station system consists of the main receiving units 100-1 to 100-M for M groups and a standby receiving unit 200. Each unit is housed in individual casing frame. The respective main receiving units 100-1 to 100-M input a respective one of STM-1 to STM-M signal strings which comply with CCITT recommendation G.708 from the respective main transmission paths 300-1 to 300-M and then respectively transmit them as N STM-1 signals to low order group transmission paths 1 to N. Although low order group signals allow not to be STM-1 signals, they are assumed to be as STM-1 signals in this description.

The main receiving unit 100-1 includes a frame synchronization section 1, an overhead termination section 2, a demultiplexing section 3, a first pointer conversion circuit section 4, a clock and frame pulse generation section 5, a switching section 6, a second pointer conversion circuit section 4, an overhead insertion section 7, a selection control section 8.

The frame synchronization section 1 detects a frame synchronous signal in a frame to STM-N signal strings inputted from the main transmission path 300-1, and operates frame synchronization to a frame pulse which is generated by dividing the transmission path clock. Also it outputs information that indicates not to detect any frame synchronous signals or disconnection of input of main transmission path signals.

Figure 2:
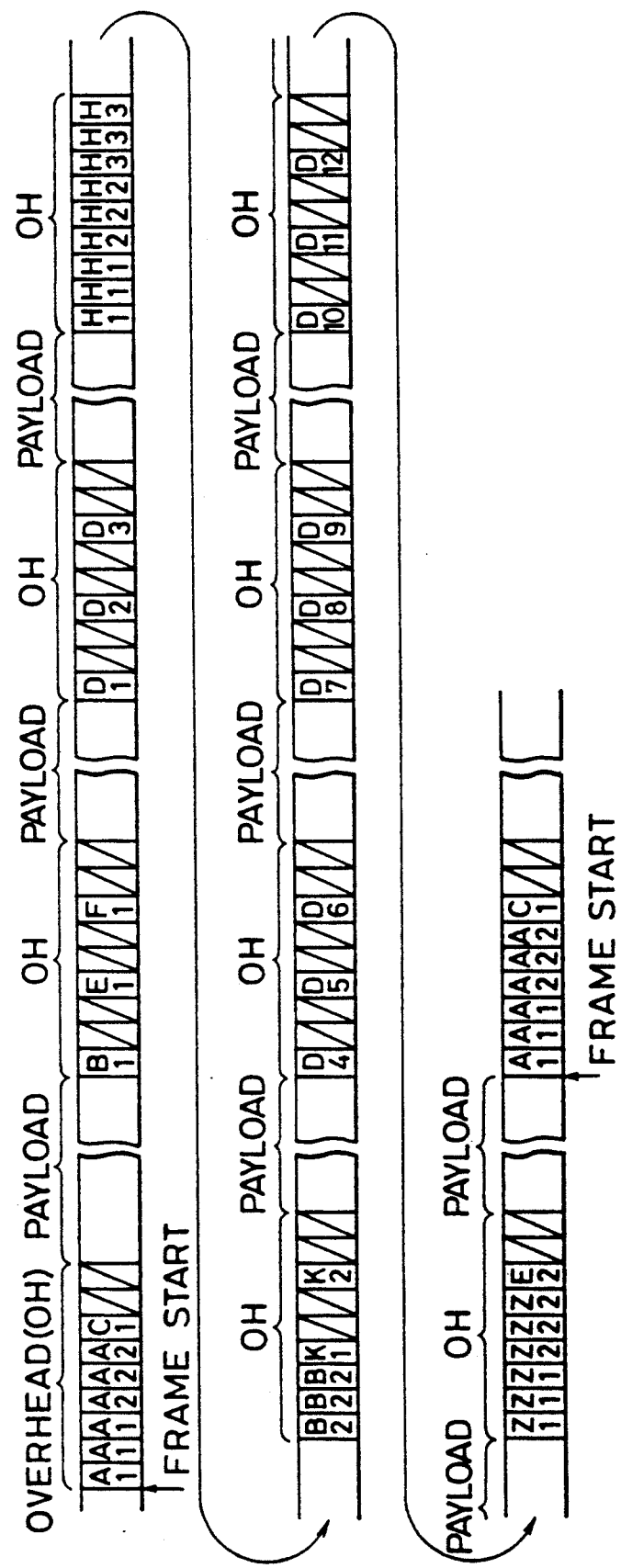
FIG. 2 illustrates a chart which shows a frame format of a STM-1 signal in the above embodiment.

FIG. 2 illustrates a frame format of a STM-1 signal. The signal rate of the STM-1 signal is 155.52 Mb/s and the frame length is 19440 bits(2430 bytes). One frame consists of nine repetitions of a cycle T which consists of nine byte overhead portion and a payload portion (a framed data string having the transmission information from a terminal station). The leading overhead of a one frame signal string includes a six byte frame synchronous signal (A1, A1, A1, A2, A2, A2), and the other overhead portion contains the information regulated in CCITT Recommendation G.708. In addition, the pointers (H1, H2, each three bytes) are placed into the overhead of the third cycle T. The pointers indicate the number of data bits from H3 bytes in the third cycle T to the frame containing the leading position of payload frame. The receiving side can then detect the frame leading position in the payload by interpreting the pointers.

The overhead termination section 2 terminates the terminal portion of the overhead portion of the STM-N signal strings inputted from the main transmission path. Also it monitors the transmission paths for error detection, outputs transmission path error information and switching information in the overhead portion transmitted from a transmitter.

The demultiplexing section 3 demultiplexes the STM-N signals to N STM-1 signal strings according to the rule for multiplexing of CCITT Recommendation G.708.

The first and second pointer conversion circuit section 4s include pointer interpreting sections (PTR INT) 41-1 to 41-N, memory circuit section (MEM) 42-1 to 42-N, pointer processing sections (PTR PROC) 43-1 to 43-N, pointer inserting sections (PTR INS). Also, they input in parallel the N STM-1 signal strings, the clock and the frame pulse from the demultiplexing section 3 or the switching section 6, and have the same circuitry configurations for each STM-1 signal strings.

Figure 3:
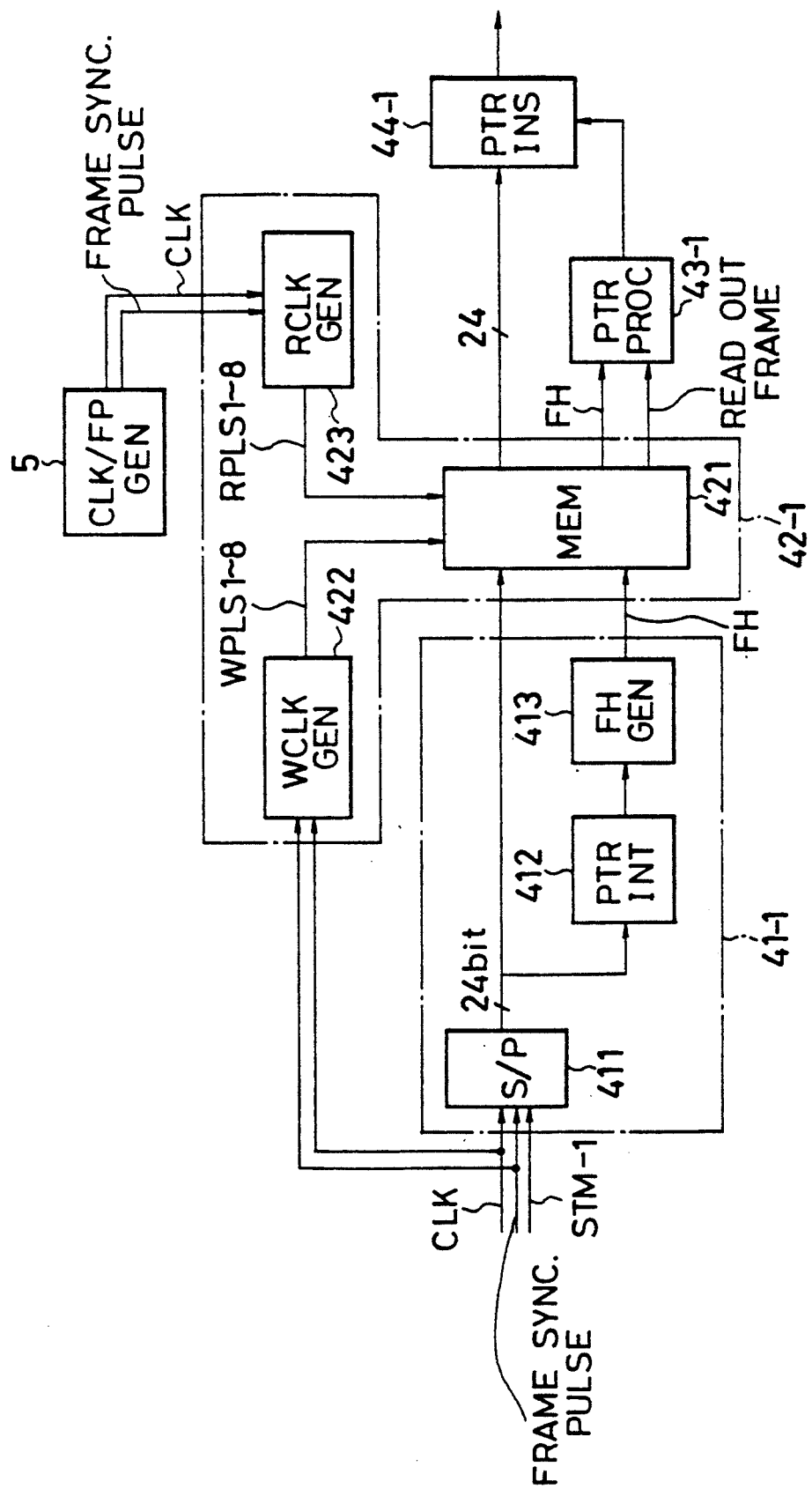
FIG. 3 illustrates a block diagram of a pointer conversion circuit unit in FIG. 1.
Figure 4:
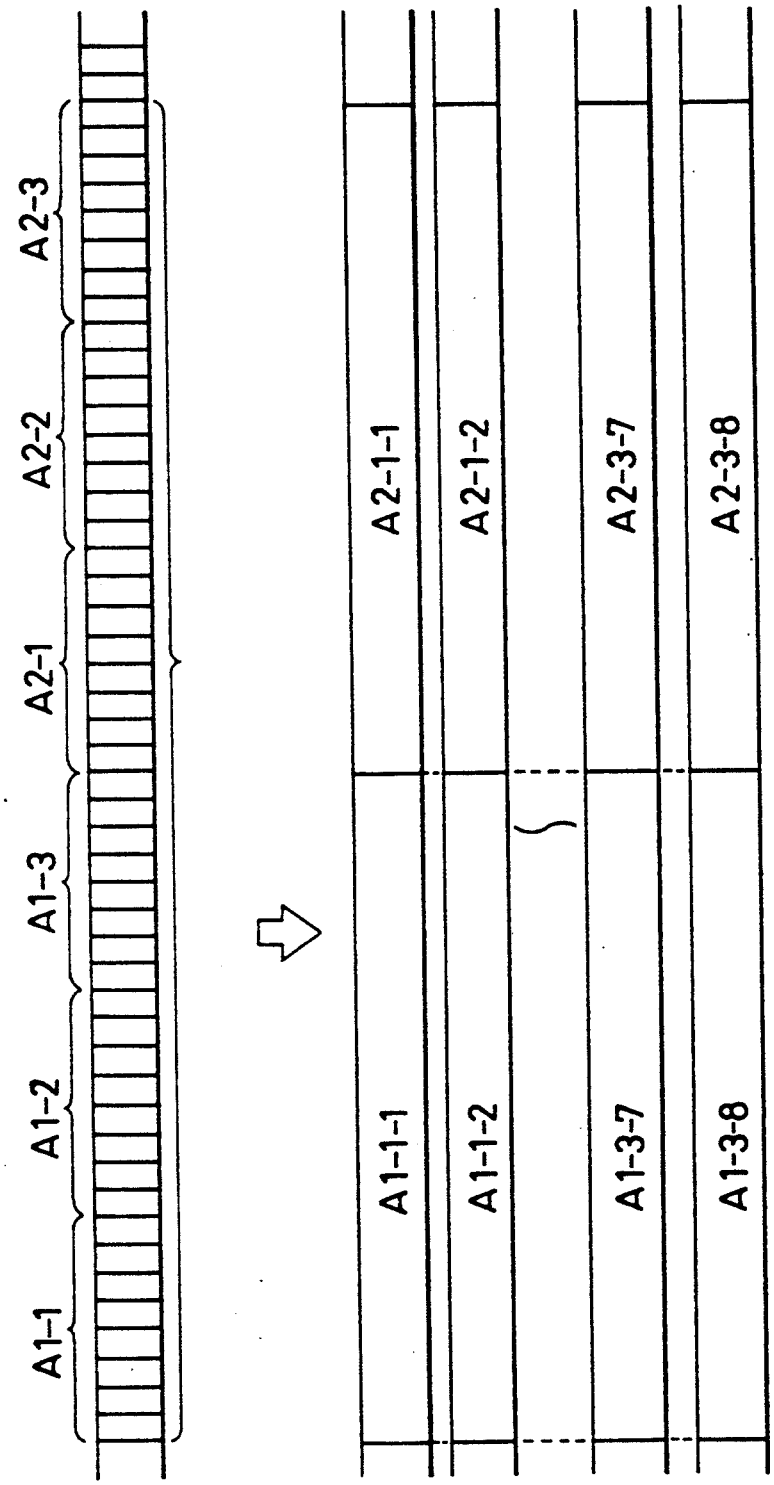
FIG. 4 illustrates a timing chart of a S/P section in FIG. 3.
Figure 5:
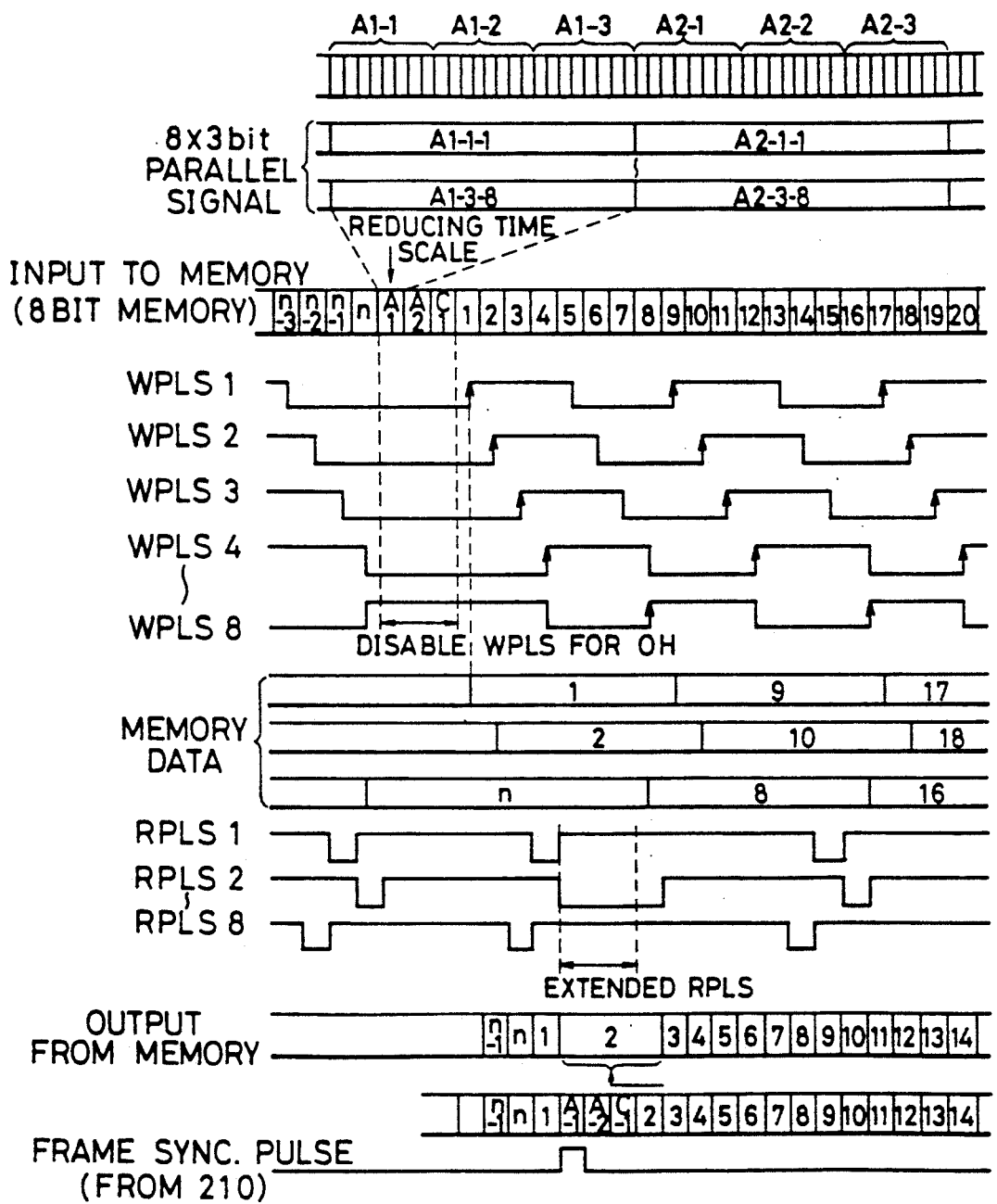
FIG. 5 illustrates a timing chart which shows a timing after the S/P section in FIG. 3.
Figure 6A:
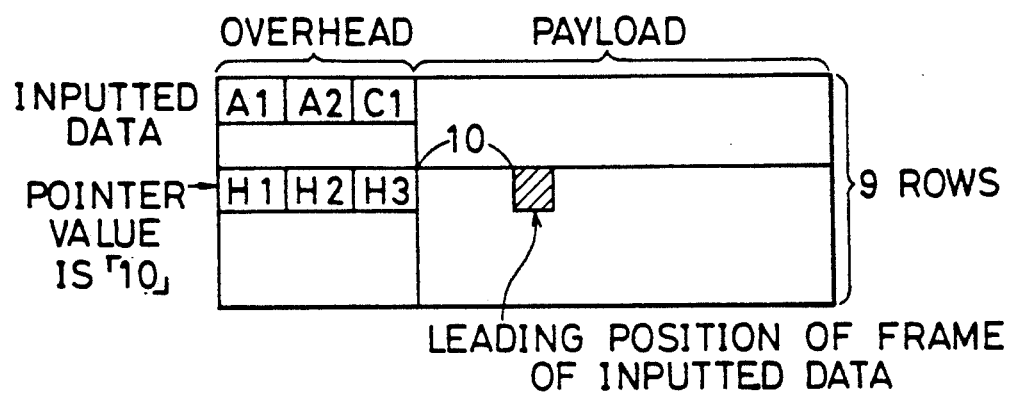
FIGS. 6(a), 6(b) and 6(c) figure to explain the operation of pointer conversion in FIG. 3.
Figure 6B:
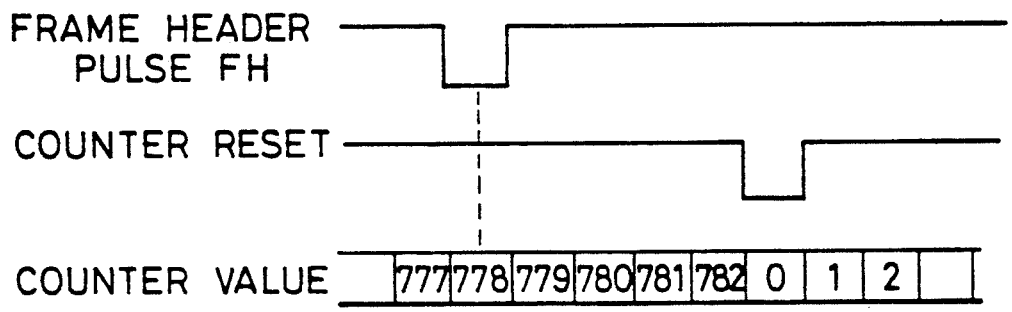
Figure 6C:
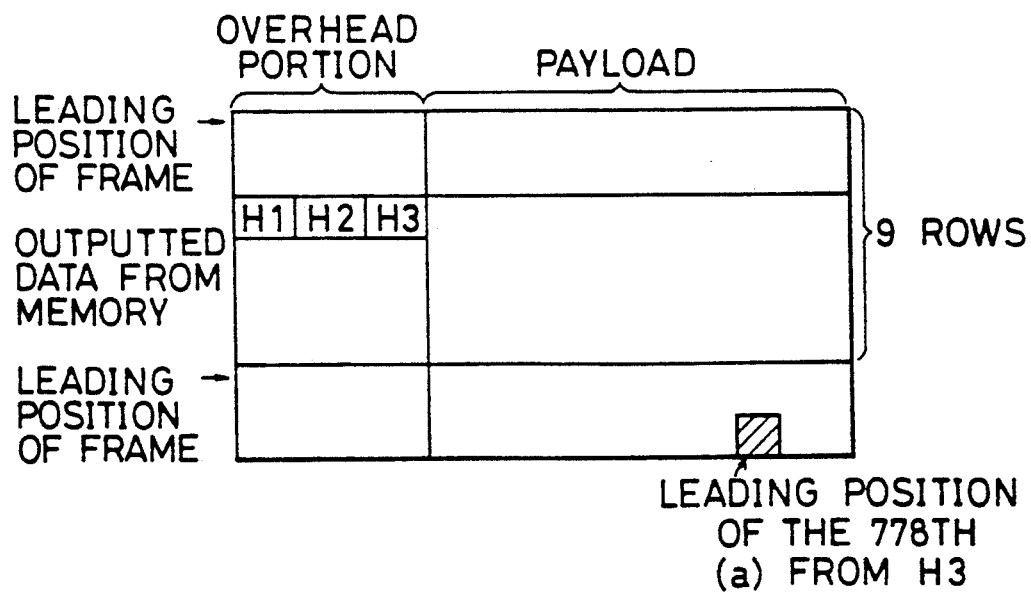

FIG. 3 illustrates a pointer interpretation circuit 41-1 in the pointer conversion circuit 4, a memory circuit 42-1, a pointer processing unit 43-1, a pointer insertion section 44-1. FIG. 4 to FIG. 6 are timing charts showing operations of these components.

In FIG. 3, the demultiplexing section 3 or the STM-1 signal, the clock and the frame pulse from the switching section 6 are converted to twenty-four parallel signal in the serial/parallel conversion (S/P) unit 411. At this time, the bit rate of each parallel signal is slowed down to 6.48 Mb/s (=155.52 Mb/s ÷24). FIG. 4 shows the input and output signals in the S/P conversion section 411. The serial/parallel conversion starts from the time of the frame pulse input.

The pointer interpretation circuit (PTR INT) 412 detects the location of the pointers H1, H2, based on the parallel signal from the STM-1 signal. In the case of the STM-1 signal, it is easy to detect the pointer location because the number of bits the pointer is located from the frame pulse A1 is predetermined. The frame header generation circuit (FH GEN) 413 detects the frame leading to the location of the data strings in the payload which follows H3 byte in the pointer overhead. This then generates the frame header pulse FH in the corresponding time slot. The frame header pulse FH is stored in the memory MEM and is read out by a reading clock pulse which is generated immediately after the storage operation.

The MEM 421 in the memory circuit 42-1 has twenty-four parallel-input/parallel-output FIFO memories. For an example, assuming that these memories consist of 8 bits the following description applies. The twenty-four parallel signals from the S/P section are temporally stored in each 8 bits parallel-input/parallel-output memory register by the writing clocks WPLS1 to WPLS8. While the memory input in FIG. 5 shows only the inputting of the twenty-four parallel signals as single bit data, each of the twenty-four parallel signals are written in as 8 bit parallel data by the writing clocks WPLS1 to WPLS8 from the writing clock generation circuit (WCLK GEN). The writing clocks WPLS1 to WPLS8 are not generated during the overhead (OH), but are repeatedly generated during the payload. Every cycle of the writing clocks WPLS1 to WPLS8 consists of 8 bit. The MEM 421 writes new data at every rising edge of WPLS1 to WPLS8.

The readout of the MEM 421 is performed at a time when the reading clocks RPLS1 to RPLS8 from the reading clock generation circuit (RCLK GEN) 423 are at low levels. The reading clocks RPLS1 to RPLS8 generates in synchronization with the clock signal of the clock and frame pulse generation circuit 5. During the overhead (OH) period, the readout clock is not generated and the readout period during this time extends as long as the length of the overhead.

The pointer processing section (PTR PROC) 43-1 has a counter which is reset to "0" just after detecting the location of H3 bytes in the pointer overhead of each frame, as determined from the readout frame (the frame pulse of the clock and frame pulse generation section 5). (Refer to FIG. 6). In the case of FIG. 6, when the frame header pulse FH is supplied from the leading location of the payload that is located immediately after the location of H3 bytes in the pointer overhead of the forward frame, is inserted into the pointer location of the new frame in response to the frame header pulse FH by the pointer insertion section (PTR INS) 44-1. The output of the pointer insertion 44-1 has no overhead other than the pointers, but the location for insertion of other overheads are reserved as shown in the memory output portion of the FIG. 5.

The switching section 6 includes the branch circuits 61-1 to 61-N and the selection sections 62-1 to 62-N. The respective branch sections 61-1 to 61-N branch the respective N STM-1 signals to two. The selection section 62-1 to 62-N output either one of the outputs of the branch section or one of the outputs of the first pointer conversion circuit section 4 by the control of the selection control section 8.

The overhead insertion section 7 consists of N overhead insertion circuits corresponding to N STM-1 signals that are the outputs of the second pointer conversion circuit section 4, inserts each overhead other than pointers in the frame shown in FIG. 2, and then outputs them to the low order group transmission paths.

The selection control section 8 inputs the information that indicates fault of a main transmission path through the frame synchronization section 1 and the overhead termination section 2, and then outputs the selection control signals of the selection sections 62-1 to 62-N.

The branch sections 61-1 to 61-N of each main receiving unit are provided for reducing the output signals of the standby receiving unit. If the system lacks these sections, the standby receiving unit has to branch and connect the same signal to respective main receiving units 100-1 to 100-M, therefore the number of the low order group outputs of the standby receiving unit becomes huge.

The standby receiving unit 200 includes a frame synchronization section 210, an overhead termination section 220, a demultiplexing section 230, a pointer conversion circuit section 240 and a clock and frame pulse generation section 250. The operation of each section is respectively similar to it of the frame synchronization section 1, the overhead termination section 2, the demultiplexing section 3, the pointer conversion circuit section 4, a clock and frame pulse generation section 5.

In this invention, the way not to adjust the frame phases by using a buffer memory having a memory capacity for one frame but to modify the pointer value according to the frame phase of the station is adopted for not changing the clock and the frame phase even in both cases of transmitting the low order group signals multiplex-selected in the main receiving unit to the low order group transmission paths and transmitting the low order group signals multiplex-selected in the standby receiving unit to the low order group transmission paths.

In this invention, it is needless to store a signal for one frame in a buffer memory for not changing the clock and the frame phase even in both cases of transmitting the low order group signals multiplex-selected in the main receiving unit to the low order group transmission paths and transmitting the low order group signals multiplex-selected in the standby receiving unit to the low order group transmission paths, because the way to modify the pointer value at the time of output of the low order group signals from the main receiving unit. Therefore, the size of circuitry can be smaller, because a high-speed and large capacity memory is not needed and it is enough a small capacity memory.

I claim:

1. A synchronous terminal station system of a 1: N redundancy configuration type having first to M-th, M being integer and greater than one, main receiving units which receive first to M-th main transmission path signals, adjust said main transmission path signals to predetermined frame phases after demultiplexing, generate first to N-th, N being integer and greater than two, low order group signals and send said low order group signals to first to N-th low order group transmission paths, said system further containing a standby receiving unit which has a standby transmission path for one of said first to M-th main transmission paths, receives standby transmission path signals, adjusting said standby transmission path signals to a predetermined local frame phase after demultiplexing, generates first to N-th low order group standby signals and sends said first to N-th low order group standby signals to said main receiving units, characterized by an $m(1 \leq m \leq M)$-th main receiving unit having:

- frame synchronization means for receiving and frame-synchronizing an m-th framed main transmission path signal having N low order group signals multiplexed, and pointer information inserted in each frame, said pointer information being indicative of a data start location for each of said low order group signal;
- first overhead termination means for terminating overheads of a frame-synchronized output of said first frame synchronization means;
- first demultiplexing means for demultiplexing an output signal of said first overhead termination means, and outputting N low order group signals;
- first pointer conversion circuit means for converting N low order group signals outputted from said demultiplexing means, using an m-th local clock and frames generated by said m-th local clock, and modifying pointer values of said N low order group signals, said m-th local clock being frequency-synchronized with a reference clock within said m-th main receiving unit;
- branch means for receiving said N low order group signals outputted from said standby receiving unit, branching each of said low order group signal to two;
- selection means for receiving each output of said branching means and said N low order group signals outputted from said first pointer conversion circuit means, outputting signals inputted from said first pointer conversion circuit means at normal condition, and outputting signals inputted from said branch means when said main receiving unit has failed;
- selection control means for controlling a selection condition of said selection means based on fault information detected in said frame synchronization means and said first overhead termination means;
- second pointer conversion circuit means for converting N low order group signals outputted from said selection means, using said m-th local clock and frames generated by said m-th local clock, and modifying pointer values of said N low order group signals; and
- first overhead insertion section means for inserting overheads to said N low order group signals outputted from said second pointer conversion circuit means, and supplying framed N low order group signals onto said N low order group transmission paths;

and further characterized by said standby receiving unit having:

- second frame synchronization section means for receiving and frame-synchronizing a frame standby transmission path signal having N low order group signals multiplexed, and pointer information inserted in each frame, said pointer information being information indicative of a data start location for each of said low order group signal;
- second overhead termination means for terminating overheads of an frame-synchronized output of said second frame synchronization means;
- second demultiplexer means for demultiplexing an output signal of said overhead termination means, and outputting N low order group signals; and
- third pointer conversion circuit means for converting N low order group signals outputted from said second demultiplexing means, using a standby local clock and frames generated by said local clock, modifying pointer values of said N low order group signals, and outputting said N low order group signals thus converted and modified onto said receiving units, said standby local clock being frequency-synchronized with a reference clock within said standby receiving unit.

2. A synchronous terminal station system as claimed in claim 1, wherein each of said first, second and third pointer conversion circuit means comprises:

- means for detecting the location of said pointer information in each of said N low order group signals inputted from one of said selection means and said demultiplexing means, and interpreting said pointer information then detecting the location where data begins after the location of said pointer information;
- clock and frame conversion means for converting said inputted N low order group signals using one of said local clock, within a respective receiving unit, and frames generated by said local clock, and said standby local clock and frames generated by said standby local clock; and
- pointer inserting means for generating said pointer information indicative of a location where data begin with respect to a predetermined pointer location in a new frame complying with said clock and frames used for said conversion inserting said pointer information as a new pointer information to output signals of said clock and frame conversion means.

* * * * *